Dec. 7, 1926.

B. C. THOMSON 1,610,180

CUSHION DRAWBAR

Filed April 5, 1926

Inventor:
Byron C. Thomson
By Wilson & McCanna
Attys.

Patented Dec. 7, 1926.

1,610,180

UNITED STATES PATENT OFFICE.

BYRON C. THOMSON, OF NEW ORLEANS, LOUISIANA.

CUSHION DRAWBAR.

Application filed April 5, 1926. Serial No. 99,734.

This invention relates generally to tractor draft appliances such as are used in hitching agricultural implements to tractors and is more particularly concerned with a cushion draw bar especially adapted for use on tractors of the Fordson type.

The principal object of the invention is to provide a device of the character referred to in the nature of an attachment to replace the standard type of draw bar cap ordinarily provided on the rear axle housings of tractors of the kind mentioned to secure a resilient draft connection and attain certain advantages hereinafter outlined.

According to the present invention, increased traction is permitted because of eliminating possibilities of the tractor tending to overturn and thereby also giving better steering control, a further advantage being that the load is always absorbed through springs and there are no strains and jerks nor is there as much wasted power through a tendency for the wheels to slip because the tractor is enabled to assume the loads gradually up to a maximum draw bar pull.

Another object is to provide a draft appliance of a generally improved and novel construction which is capable of economical production and serves the purposes intended in a practical and effectual manner.

The invention is disclosed in the accompanying drawing in which—

Figure 1:
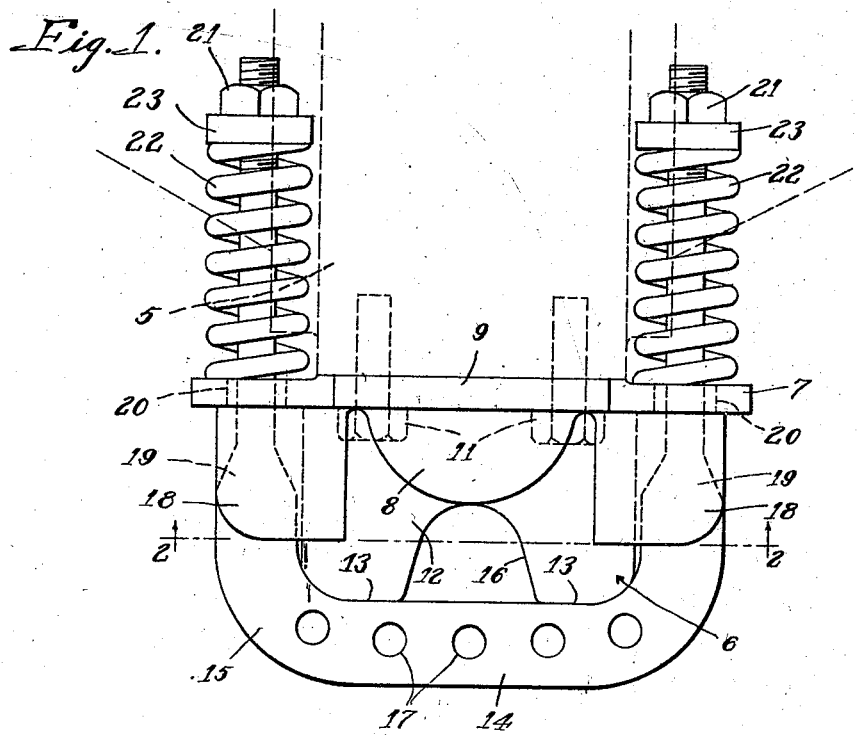
Figure 2:
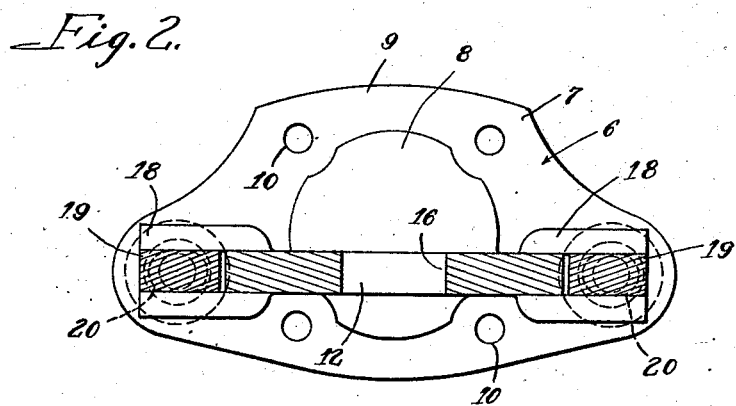

Figure 1 is a plan view of a cushion draw bar made in accordance with my invention shown diagrammatically as mounted on the rear axle housing of a tractor; and Fig. 2 is a transverse vertical section taken on the line 2—2 of Fig. 1 looking in the direction indicated by the arrows.

In the present application I have, for purposes of illustration, shown my invention in the nature of an attachment for Fordson tractors but it will be understood that the features embodied are capable of use on tractors of a variety of types. In the Fordson type, it has been common practice to provide a cap on the rear axle housing 5 provided with a rearwardly projecting lug or flange onto which the implement or other load to be drawn was hitched by a rigid connection. There was no provision for assuming the load gradually and absorbing the severe strains and sudden jerks that often caused breakage or, at any rate, were a source of much wear and tear on the tractor.

According to the present invention, I provide a cushion draw bar, indicated generally by the reference numeral 6, providing for a resilient draft connection to avoid the objectionable features above referred to.

The draw bar 6 comprises a plate 7 cast to provide a central cap portion 8 having a flange 9 with bolt holes 10 therein to receive bolts 11 for securing the cap to the back of the rear axle housing 5 and replace the standard draw bar cap otherwise provided. The plate 7 has an integrally cast rearwardly projecting rib 12 extending transversely relative to the cap portion 8 to provide abutments at 13 at the opposite extremities thereof for the bight portion 14 of a U-shaped draw bar 15. The mid portion of the rib 12 is relieved or cut away, as indicated at 16, to leave a clearance between the rib and the draw bar through which a chain connection may be made with an agricultural implement or other load to be drawn. A plurality of spaced holes 17 is provided in the bight portion 14 of the draw bar 15 to receive pins, clevices or the like in the hitching of the load to be drawn.

The rib 12 has cast integrally therewith and with the plate 7 a pair of lateral extensions 18 in the form of forked guides to receive the forwardly extending arms 19 of the draw bar 15. The arms 19 are slidable in the guides and extend through holes 20 in the plate 7 which are sufficiently elongated to allow for a certain amount of movement of the draw bar 15 relative to the plate in operation. The free ends of the arms 19 are threaded, as shown, to receive nuts 21 which serve to back up heavy coiled compression springs 22 mounted about the arms 19 and bearing between the plate 7 and washers 23 provided behind the nuts 21. The springs 22, of course, serve to assume the load on the draw bar in an obvious manner while the abutments 13 assume the brunt of the load in backing up.

The advantages derived in the use of the present device as briefly outlined above, are that it is possible to secure increased traction because the load is assumed gradually through the resilience afforded by the springs. In this way the tractor eventually delivers its maximum draw bar pull without as much tendency for slippage of the wheels as in the case of rigid draft connections. Consequently a considerable saving in power and fuel cost is also derived by this draft connection. Furthermore, the elimination of sudden jerks and severe strains which are absorbed in the springs through which all the load is handled lessens the danger of breakage of parts, increases the life of the tractor and gives generally smoother operation. The construction of the present device affords the necessary strength and durability by having the cap, the abutment, and the draw bar guides all cast in one piece. This also insures a saving in cost and simplifies the matters of assembling and shipment while from the purchaser's standpoint the matter of applying the device to the tractor in place of the draw bar cap is simplified by the device being provided as a unitary structure. No special skill or lengthy instructions are required for anyone to apply the cushion draw bar to his tractor.

I claim:

1. A cushion draw bar for tractors of the Fordson type, comprising a plate cast to provide a central cap portion to bolt onto the back of the rear axle housing of the tractor, said cap portion having lateral extensions providing therein a pair of laterally spaced horizontal guides and having an intermediate rearwardly projecting abutment, a draw bar formed in a U-shape having the arms thereof extending forwardly through and slidable in said guides with the intermediate bight or draft connection portion thereof resting against said abutment, and a pair of heavy coiled compression springs mounted about the free ends of the arms of said draw bar and acting between the same and said plate to assume the load on said draw bar, said abutment being provided with a relieved portion opening from the rear side thereof and spanned by the bight portion of said draw bar.

2. In a cushion draw bar for tractors of the Fordson type, a plate arranged to serve as a cap for the back of the rear axle housing of the tractor, said plate being cast to provide a rearwardly projecting transverse rib reinforcing the same and serving as a draw bar abutment, said rib being forked at opposite ends to provide a pair of laterally spaced horizontal guides for the draw bar, a draw bar formed in a U shape having the arms thereof extending forwardly through and slidable in said guides with the intermediate bight portion thereof resting in engagement with said abutment, said bight portion being provided with a plurality of spaced openings in which to make draft connections with the draw bar, and a pair of heavy coiled compression springs mounted about the free ends of the arms of said draw bar and acting between the same and said plate to assume the load on said draw bar.

3. In a cushion draw bar for tractors of the Fordson type, a plate arranged to serve as a cap for the back of the rear axle housing of the tractor, said plate being cast to provide a rearwardly projecting transverse rib reinforcing the same and serving as a draw bar abutment, said rib being forked at opposite ends to provide a pair of laterally spaced horizontal guides for the draw bar, a draw bar formed in a U shape having the arms thereof extending forwardly through and slidable in said guides with the intermediate bight portion thereof resting in engagement with said abutment with an intermediate portion thereof lying in spaced relation to an adjacent portion of said abutment to facilitate making draft connections on said draw bar, and a pair of heavy coiled compression springs mounted about the free ends of the arms of said draw bar and acting between the same and said plate to assume the load on said draw bar.

In witness of the foregoing I affix my signature.

BYRON C. THOMSON.